United States Patent [19]
Double

[11] 3,830,955
[45] Aug. 20, 1974

[54] COUPLING HEAD ADAPTER
[76] Inventor: Richard L. Double, 1926 Raxanne Ave., Long Beach, Calif. 90813
[22] Filed: July 19, 1973
[21] Appl. No.: 380,670

[52] U.S. Cl............. 174/65 R, 174/74 R, 310/71, 310/87, 417/422
[51] Int. Cl... F04b 39/00, F04b 47/00, H02g 15/00
[58] Field of Search........ 174/47, 65 R, 68 R, 74 R; 310/71, 87; 417/410, 422

Primary Examiner—Laramie Askin

[57] ABSTRACT

An adapter to connect a coupling part and related sealing means structure at the end of an electric cable with a non-compatible coupling part receiving means and related sealing means structure in equipment with which the cable is to be connected; said adapter comprising an insert engagable between the non-compatible coupling part and receiving means and defining receiving structure compatible with the coupling part and its related sealing means structure and defining coupling part structure compatible with the receiving means and its related sealing means structure whereby the non-compatible coupling part and coupling part receiving means can be related and coupled to establish sealed connection between the cable and the equipment.

9 Claims, 8 Drawing Figures

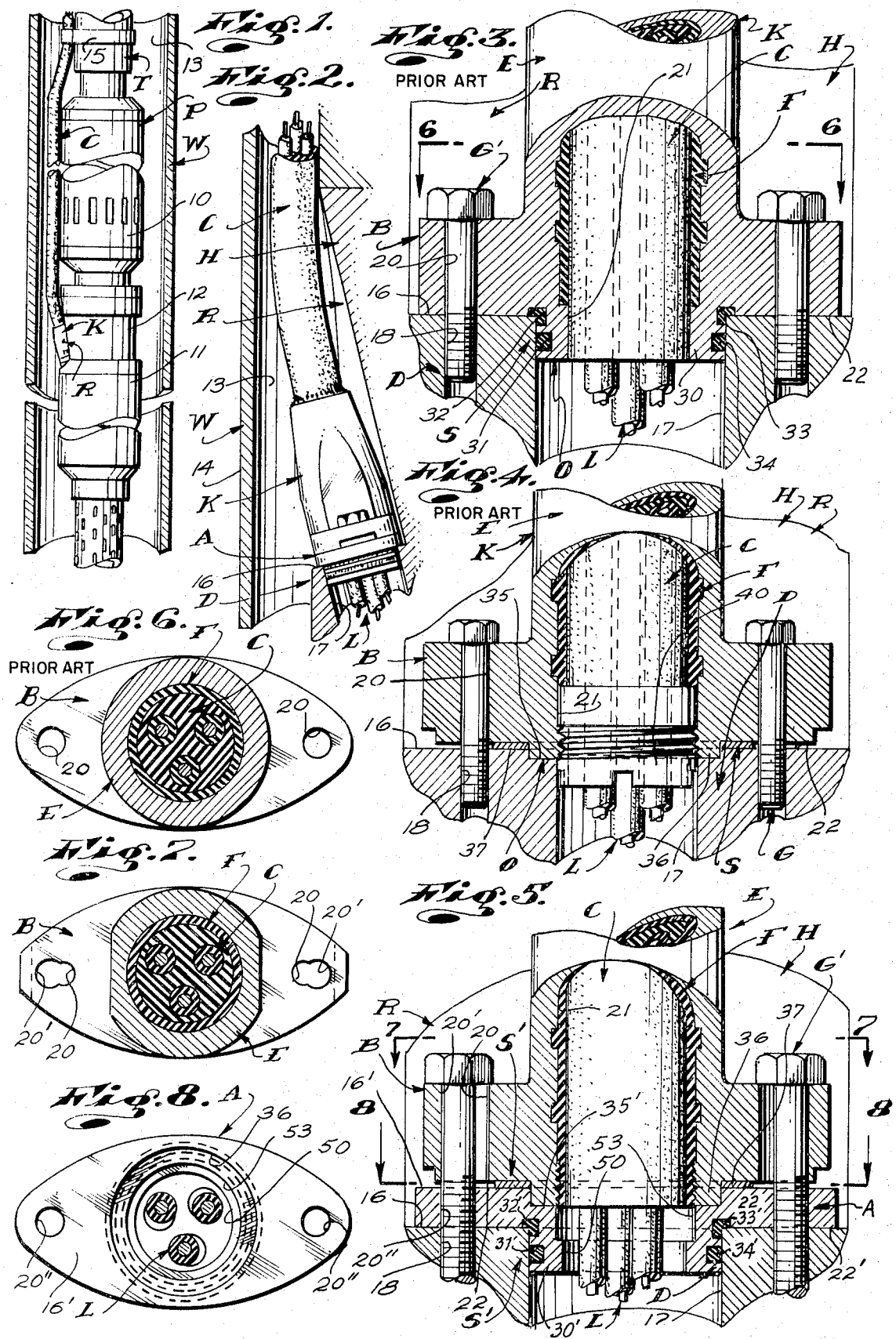

COUPLING HEAD ADAPTER

The present invention has to do with an adapter to facilitate connecting an electrical conductor cable having a standard coupling part at one end with a standard coupling receiving means adapted to receive another, dissimilar standard coupling part. More particularly, the invention has to do with an adapter to facilitate connecting a coupling part on a power cable with an electric, submersible, oil well pump with coupling receiving means which are non-compatible with the coupling part.

In the oil producing industry, it is common practice to employ or use electric powered submersible pumps in well structures to deliver oil from oil producing formations to the tops of wells. In the United States the vast majority of submersible oil well pumps are produced by Reda Pump Company of Bartlesville, Oklahoma, hereafter called "Reda," and Byron Jackson, Inc., of Tulsa, Oklahoma, hereafter called "B.J." The Reda and B.J. pump structures include elongate cylindrical bodies engageable in strings of production tubing which extend into cased wells, the bodies house the pumping means and the electric motors for driving said means and are provided with coupling receiving means at one side, opening to the annulus between the bodies and the casing structures in the wells and adapted to cooperatively receive coupling parts on the lower end of electric power cables extending from the tops of the wells, through the noted annulus, to the pumps. The coupling receiving means, in both makes of pumps, comprise recesses in the sides of the bodies with flat, upwardly and radially outwardly disposed, inclined mounting surfaces with centrally arranged bores or chambers to receiving portions of special coupling parts and pairs of fastener receiving openings, spaced for opposite sides of the chambers or bores to accommodate screw fasteners to secure the coupling parts in place in and with the bodies. The recesses in the bodies are required to provide space to accommodate the coupling parts since the annulus between the pump bodies and the related casing structure is frequently insufficient to accommodate an adequate and effective coupling part or structure.

The noted angular disposition of the mounting surface of the coupling receiving means is required and necessary due to the fact that the coupling parts are rigid and of considerable longitudinal extent, and the cables are so heavy and stiff that they cannot be caused to make a sharp, small radius bend. As a result of the above, the coupling parts must be arranged with their axes extending outwardly and upwardly from within the outer limits of the bodies and into the annulus of the related well structures and in such a manner that the cables extend and continue upwardly therefrom, in the annulus, without sharp bends and the like.

The coupling parts for both Reda and B.J. pumps are similar in that each includes an elongate, substantially vertical, tubular body with an open upper end and into which the lower end portion of a cable is engaged, fixed and sealed by means of potting, that is, by means of a sealing and cementing compound, which, in practice, is a rubber or rubberlike compound, set and cured in and with the coupling part and cable by vulcanizing.

The Reda and B.J. coupling parts are further alike and are characterized by elongated, laterally extending mounting flanges at the lower ends of the coupling bodies, corresponding generally in plane configuration with the mounting surfaces of the receiving means of the pumps and having flat, bottom surfaces to engage the noted mounting surfaces of the pumps and having fastener receiving openings registering with the fastener receiving openings of the pumps.

Finally, the Reda and B.J. coupling parts are similar in that each is provided with a cylindrical tubular orienting projection depending from the bottom surface and engageable in the bore or chamber in the pump with which it is related.

In both the Reda and B.J. coupling parts, pig-tail like leads of the three conductors of the cables related thereto extend freely from within the orienting projections of the coupling parts and are adapted to be suitably connected with appropriate terminals and the like within the pumps and accessible at or within the receiving bores or chambers thereof.

While the longitudinal extent of Reda and B.J. coupling parts are about the same and while the plane configuration of the mounting surfaces on the pumps and the mounting flanges of the couplings are about the same, the size and extent of the noted orienting bores or chambers and orienting projections, and the size and spacing of the fastener receiving openings are dissimilar, whereby the coupling parts for one make of pump are not compatible with the receiving means of the other make of pump.

In addition to the foregoing, the Reda and B.J. coupling parts and receiving means are provided with and include special and distinct sealing means to seal between the parts and their related pump bodies. In the B.J. structure, the sealing means includes a pair of spaced O-ring grooves about the orienting projection, and O-ring seals in the grooves sealing between the projection and the receiving bore when the projection is engaged in said bore. In the Reda structure, the sealing means includes an annular stop shoulder projecting down from the bottom surface about the upper portion of the projection and a lead sealing washer about the shoulder and engaged in compressed, compacted, sealing relationship between the mounting and bottom surfaces when the coupling part is engaged and secured with the pump.

The noted bore and projection in the B.J. structure are larger in diameter than the bore and projection in the Reda structure and the fastener openings and related fasteners in the Reda structure are smaller and closer together than in the B.J. structure.

In light of the foregoing, it will be apparent that in spite of the similarities that appear to exist in the Reda and B.J. coupling parts and receiving means, the coupling parts of each are totally incompatible and cannot be used to connect with the pump of the other.

In practice, the cables employed to supply power to both B.J. and Reda pumps are alike, except for the coupling parts which are potted or vulcanized onto their lower ends and made a part thereof. Such cables are high capacity, heavy duty cables which are extremely costly and which are frequently as much as 15,000 feet in length.

In practice, in one oil field, operated by one producing company, there may be a multiplicity of Reda and B.J. pumps in use. In the course of servicing the wells, for cleaning of the pumps, repair of the cable and the like, the operator of the field must have spare B.J. and Reda cables on hand at all times and cannot use a Reda cable with a B.J. pump or vice-versa. As a result of the above, a costly and inconvenient inventory of cables must be maintained.

In the case of service companies, engaged in the servicing of submersible pumps and their cables and whose services are frequently rendered under emergency conditions, an inventory of Reda and B.J. cables must be maintained and both forms of cables must or should be transported and made available on each call for service so that whatever form of pump is employed, be it a Reda or B.J. pump, the required service can be effected with dispatch.

Further, those in the field that service submersible pump cables by replacing and potting the coupling parts thereon must have and maintain a supply of both Reda and B.J. coupling parts.

In practice, both Reda and B.J., in addition to selling and/or leasing the pumping equipment, including both the pumps and the cables, offer service for their equipment. In furtherance of their servicing businesses, they are reluctant to sell coupling parts to others and to thereby enable and encourage others to compete in the servicing business. Such practices, while not preventing others for independently producing the necessary coupling parts as needed (at considerable expense) adds to the difficulty, inconvenience and expense of field operators and independent service companies to establish and maintain an approximate inventory of cables.

As a practical matter, due to the differences in the B.J. and Reda cable coupling parts and the extra cost of maintaining inventories of both B.J. and Reda cables, most field operators endeavor to limit themselves to the employment and use of either B.J. or Reda pumps, in spite of the fact that they would like and prefer the option of using both.

An object of this invention is to provide an adapter for effecting the connecting of a power cable with a Reda coupling part with a submersible B.J. pump whereby special cables for both Reda and B.J. pumps need not be provided and be made available in the course of servicing those different makes of pumps and the cables therefor and whereby the users of either make of pump are not inhibited or prevented from changing and using the other make of pump due to the inconvenience and cost of changing cables.

It is an object and feature of my invention to provide a simple, practical, durable and inexpensive adapter in the nature of a plate arrangeable between the coupling part mounting surface of a B.J. pump and the bottom surface of a Reda cable coupling part whereby a Reda coupling part can, with minor, easy and simple to make alterations, be effectively related and connected with a B.J. pump.

It is another object and feature of my invention to provide an adapter of the character referred to above wherein the Reda coupling part is modified by providing or adding larger diameter fastener receiving openings in the mounting flange of that part, laterally outward of the existing fastener receiving openings of that part.

Yet another object and feature of the instant invention is to provide a plate-like adapter of the character referred to having an upper mounting surface to oppose the mating surface of a related Reda coupling part, an annular stop shoulder and seal for engagement with and between those surfaces, an upper bore to receive the orienting projection of the Reda coupling part, a bottom surface to oppose the mounting surface of a related B.J. pump and a lower orienting projection with O-ring grooves and carrying O-ring seals to be cooperatively engaged in the chamber or bore in the B.J. pump.

It is an object of my invention to provide an adapter of the general character referred to above which is such that it can be established to connect Reda cable coupling parts to B.J. pumps.

It is to be noted that since the orienting projection of the B.J. coupling part, which carries the O-ring seals, is and must be considerably greater in axial extent than the orienting projection of the Reda coupling part, it is desirable and preferred that the adapter be made to effect connecting of a Reda coupling part to a B.J. pump, since the upper orienting bore in such an adapter need not be so deep and the vertical extent of the adapter can therefore be minimized, conserving of space, material and affording greater stability.

The foregoing and other objects and features of my invention will be fully understood from the following detailed description of typical preferred forms and applications of my invention, throughout which description reference is made to the accompanying drawings in which:

FIG. 1 is an elevational view of an electric, submersible oil well pump arranged in a well structure;

FIG. 2 is an enlarged portion of the structure shown in FIG. 1 with portions shown in section to better illustrate the electrical coupling means;

FIG. 3 is an enlarged detailed sectional view of a prior art B.J. type electrical coupling means;

FIG. 4 is an enlarged detailed sectional view of a prior art Reda type electrical coupling means;

FIG. 5 is an enlarged detailed sectional view of a Reda type coupling part connected with a B.J. pump structure by means of my new adapter;

FIG. 6 is a view, of reduced scale, taken substantially as indicated by line 6—6 on FIG. 3;

FIG. 7 is a view, of reduced scale, taken substantially as indicated by line 7—7 on FIG. 5; and FIG. 8 is a sectional view, of reduced scale, taken substantially as indicated by line 8-8 on FIG. 5.

In the drawings, the structure which will hereinafter be referred to as Reda and B.J. structures are not true or exact illustrations of those structures produced by Reda Pump Company or by Byron Jackson Company (both of Oklahoma), but are simply illustrations of basic nature of those companies' structures and only show those parts and portions which effect and/or directly relate to the instant invention in a substantially proper form and in substantially proper proportion and relationship.

Referring to FIG. 1, I have shown an electric, submersible oil well pump P arranged in a well structure W. The pump P includes a pump section 10 fixed to the lower end of a string of production tubing T, a motor section 11 below and in alignment with the section 10 and a seal section 12 between the sections 10 and 11.

The motor section 11 includes an elongate, vertical, cylindrical housing H with a recess R on one side thereof and in which an electrical connector or coupling A, at the lower end of a power cable C, is arranged and fixed.

The assembled structure described above is arranged within the structure W, in the production fluid therein and with the cable C extending upwardly from the motor section 11 in the annulus 13 between the well casing or liner 14 and the pump and tubing. The cable C above the pump P is secured to and supported by the tubing by spaced clamps 15, one of which is shown in FIG. 1 of the drawings.

The pump structure and its relationship with the cable C and well structure W, illustrated in the drawings and described above, is illustrative and is typical of those electric, submersible oil well pumps produced and sold by Reda Pump Company of Bartlesville, Oklahoma and Byron Jackson of Tulsa, Oklahoma.

The electric submersible oil well pumps produced by the above noted manufacturers are the most common and widely used pumps of the class of submersible pumps here concerned with.

In addition to the above noted basic nature and characteristics of submersible pumps, the pumps produced by the above noted manufacturers and by other manufacturers of such pumps and replacement parts therefor, have other common and similar features. For example, the recesses R in the pump housings H are characterized with flat, radially outwardly and upwardly inclined bottom surfaces 16 with centrally arranged, upwardly and outwardly opening cylindrical, bore-like electrical junction chambers 17 extending down and into the housings and a pair of laterally spaced fastener receiving openings 18. The surfaces 16, chambers 17 and openings 18 cooperate to define coupling receiving means D, with and in which couplings K at the lower ends of the cables C are related.

The cables C are stiff, heavy duty, rubber jacketed cables with three plastic jacketed conductors. The conductors have pig-tail like leads L extending from the lower end of the cable, which leads are adapted to extend into the chambers 17 of related pumps and to connect with appropriate related power and ground conductors and/or terminals of the motor structure. Since the manner in which the leads L connect with the motor structure does not affect my invention, I have elected not to burden this disclosure with details thereof.

The couplings K, at the lower ends of the cables C, enagageable in the recess R and with the receiving means D are characterized by flat, flange-like bases B corresponding generally in plane configuration with the shape of the surfaces 16 of the means D and having fastener receiving openings 20 to register with the openings 18 of the means D. The couplings K further include elongate vertical bodies E arranged centrally of and projecting upwardly from the bases B. The couplings are next characterized by elongate central bores 21 in and through which the lower end portions of the cables C are freely engaged and in which the cables are fixed and sealed by an annular mass of rubber, a rubber-like compound F which is preferably cured by vulcanizing. The leads L of the cable extend below the lower open end of the bores 21.

Finally, the couplings K are characterized by sealing means S to seal between the base portions of the couplings and the means D of the housings H. The sealing means S include orienting means O which depend from the flat bottom surfaces 22 of the bases and enter the chambers 17 of the means D and suitable sealing rings related thereto.

The couplings K, with the cables C related thereto are adapted to be arranged with their bottom surfaces 22 in opposed relationship with the surfaces 16 of their related pump (or means D), with the orienting means engaged in the chambers 17 and with the leads L extending freely into the chambers 17. Bolt-type screw fasteners G' are engaged in and through the openings 18 and 20 and are advanced to hold the couplings in secured clamped engagement with the housings.

It is to be noted that the bases B are substantially ovoid in plane configuration and have end portions projecting laterally at opposite sides of the bodies E and that the openings 20 occur in said end portions and in spaced relationship from the opposite sides of the bodies.

The couplings K and means D of both Reda and B.J. constructions are to the extent noted above, and as they affect or relate to the instant invention essentially alike.

The couplings K and means D of Reda and B.J. differ from each other and are rendered noninterchanged or non-compatible by the following structural differences.

In B.J. structures, as illustrated in a general manner, in FIGS. 3 and 6 of the drawings, the chamber 17 of the means D is a large dimeter-bore or chamber and the registering openings 18 and 20 of the means D and in the coupling K are large openings spaced a substantial distance outward of the central axis of the coupling body and the chamber and are adapted to receive large diameter bolts G.

In Reda structures, as illustrated in a general manner in FIG. 4 of the drawings, the chamber 17 of the means D is a small diameter-bore or chamber (smaller than the B.J. chamber) and the registering openings 18 and 20 of the means D and in the coupling K are small openings (smaller in diameter than corresponding openings in the B.J. structure) and are spaced a lesser distance outward of the central axis of the coupling than are the corresponding openings in B.J. structures and are adapted to receive smaller or small diameter bolts G.

Comparing the two noted structures, the B.J. structure has a large or major central, cylindrical bore or chamber 17 and large or major, laterally spaced outside fastener openings 20 and 18, while the Reda structure has a small or minor bore or chamber 17 and small or minor, laterally spaced inside fastener openings 18 and 20. The terms "minor", "major", "inside" and "outside", as here used, relate to the relative size of the chambers and the relative size and positioning of the openings 18 and 20 in Reda and B.J. structures wherein the chamber in the B.J. structure is larger than the Reda chamber and the smaller openings 18 and 20 of the Reda structure are spaced a lesser distance, laterally of the central axes of the structure.

The above noted distinctions can be readily seen by a comparison of FIGS. 3 and 4 of the drawings.

In the B.J. structure and as illustrated in FIG. 3 of the drawings, the orienting means O comprises a central, annular, cylindrical or tubular skirt 30 formed integrally with and depending from the bottom surface 22 of the coupling base, which skirt is slidably entered in the chamber 17 of the means D.

In B.J. the sealing means S includes a pair of vertically spaced, annular, radially outwardly opening O-ring grooves 31 and 32 in the skirt 30 and O-ring seals 33 and 34 in the grooves to seal with and between the skirt and the wall or bore of the chamber 17. In practice, and as shown, the groove 32 is formed at the junction of the skirt and surface 22 of the coupling base, is larger in major diametric extent than the skirt and such that the groove extends into the base and opens downwardly, as well as outwardly, whereby the O-ring 33 seals about the annular corner established by the surface 16 of the means D and the chamber.

In Reda structure, the orienting means O includes a central, annular, radially inwardly and upwardly opening recess 35 in the surface 16, about the upper end of the chamber 17 and a central, annular, depending boss 36 formed integrally on the base portion of the coupling and slidably entered and stopped in the recess 35, as shown in FIG. 4. The boss 36 is slightly greater in vertical extent than the recess 35 and bottoms out on the bottom of the recess to maintain the surfaces 16 and 22 in predetermined spaced relationship.

The sealing means S in the Reda structure includes an annular, washer-like, malleable metal or lead, sealing ring 37 about the boss 36, held tight between the surfaces 16 and 22 as shown in FIG. 4 of the drawings.

It is to be noted that the boss 36 of the means O in the Reda structure is larger in diameter than the chamber 17 and occurs outward thereof, in the recess 35; while in the B.J. structure, the skirt 30 slidably enters the chamber. Accordingly, the orienting and sealing means of Reda and B.J. structures are not compatible and the couplings of one cannot be engaged with the receiving means of the other.

The differences in the size and spacing of the fastener openings 18 and 20 in the noted structures further renders them non-compatible.

In Reda structures, as shown in FIG. 4 of the drawings, a keeper sleeve 40 is engaged in the lower ends of the central bore or openings in the coupling to retain an apertured plug-like keeper through which the cable leads L are engaged. The lower portion of the sleeve 40 depends from the coupling into the chamber. The sleeve and keeper are provided to facilitate orienting the leads L and potting of the cables in the couplings. In practice, it has been found that the sleeves and keepers are not in fact necessary and are frequently not used when the cables are serviced and used couplings are reconnected with the cables. In FIG. 5 of the drawings, I show a Reda type coupling related to a cable C without the above noted sleeve and keeper.

The present invention includes the provision of a modified Reda-type coupling K and an adapter A engageable with and between Reda type couplings and B.J. receiving means D whereby cables with a single, modified Reda type coupling can be easily and effectively related to and engaged with the receiving means of both Reda and B.J. type pumps.

The modified coupling K, as shown in FIGS. 5 and 7 of the drawings is, basically, a Reda coupling and is simply and easily modified by the adding of major outside fastener openings 20' in the base portion of the couplings. The openings 20' are larger than normal or standard, minor inside openings of the coupling and are on axes spaced laterally outward of the openings 20. The axes of the openings 20' are spaced outward of the axes of the openings 20 a distance less than the diametric extent of the openings 20' whereby adjacent openings 20 and 20' intersect and open or communicate with each other, as clearly shown in the drawings.

With the above noted modification, it will be noted that the modified Reda type coupling can be arranged above and in alignment with the receiving means D of a B.J. pump and that fasteners G' for B.J. structures can be effectively engaged through the openings 20' in the base portion of the coupling and into openings 18 of means D of a related B.J. pump structure. Such a combination and relationship of parts is clearly illustrated in FIG. 5 of the drawings.

It is to be noted that the above described modification of the Reda-type coupling does not effect or prevent relating and connecting the coupling with a Reda-type pump structure, as clearly shown in FIG. 4 of the drawings.

The adapter A that I provide is a flat, platelike part corresponding in plane configuration with the base portion of a B.J. type coupling and has flat top and bottom surfaces 16' and 22'. The adapter A is next characterized by a central vertical opening 50 corresponding in diameter with the central opening in a B.J. coupling and a pair of laterally spaced, vertical, through openings 20" corresponding in diameter and lateral placement with the openings 18 of the means D of B.J. pumps.

The adapter A is next provided with a central, upwardly opening recess 35' entering its top surface 16' and corresponding with the recess 35 of the means D in Reda pump structures and is provided with a counter bore 53, which corresponds in diameter with the chamber 17 in Reda pump structures and which is sufficiently deep to accommodate a Reda keeper retaining sleeve 40, such as is shown in FIG. 4 of the drawings, if such a sleeve is not dispensed with.

It is noted that the counter bore 53 is larger in diameter than the opening 50, enters the bottom of the recess 35' and terminates above the lower open end of the opening 50.

With the structure thus far described, it will be apparent that the modified Reda coupling, shown in FIGS. 5 and 7 of the drawings, can be cooperatively engaged in and with the adapter, as shown in FIG. 5 of the drawings, and can be secured thereto, in oriented sealed relationship by means of the bolts G' and the orienting and sealing means of that coupling.

The adapter A is next characterized by an orienting skirt 30' corresponding in axial and diametric extent with the skirt 30 of B.J. couplings, depending from the bottom surface 22' of the adapter and engageable in the chamber 17 of a B.J. pump structure, as clearly illustrated in FIG. 5 of the drawings. The opening 50 enters the lower end of the skirt 30'. The lower portion of the counter bore 53 extends into the skirt 30' and in such a manner that the vertical extent of the adapter can be maintained at a minimum.

The skirt 30' is the same or the equivalent of the orienting means O of the B.J. construction and, like the B.J. construction, has sealing means S', comprising grooves 31' and 32' and O-rings 33' and 34', identical with the sealing means S of the B.J. structure.

Laterally spaced fastener openings 20" to register with the openings 18 of a B.J. pump structure and with the openings 20' of a modified Reda coupling are provided in the adapter.

In practice, the adapter A can be and preferably is established from the base portion B of a B.J. coupling. Such establishment of the adapter is effected by cutting a B.J. coupling in two, on a plane substantially midway between the top and bottom surfaces of the base portion, retaining the lower portion or piece with the orienting and sealing means O and S, machining the top surface 16' of the adapter structure thereon and drilling or boring out the recess 35' and counter bore 53 therein.

In light of the above, it will be apparent that the adapter A can be established of old or discarded B.J. couplings and is established by a minimum number of easy and economical to perform machining operations.

In use, the adapter A is engaged and oriented with the receiving means D of a B.J. pump structure, in sealed relationship therewith. The modified Reda coupling K, on the lower end of a cable C is next engaged and oriented with the adapter and finally, the bolts G' are engaged through the registering openings 20', 20" and 18 and are tightened to compact and set the lead seal of the sealing means S of the Reda coupling with the adapter and to urge and hold the coupling, adapter and pump structure in tight, secure engagement with each other.

With the adapter A and with the modified Reda coupling K, it will be apparent that the cable C with which the coupling K is related can be advantageously and effectively engaged with a Reda pump structure without the adapter and can, through use of the adapter, be advantageously and effectively engaged with a B.J. pump structure. Accordingly, well service companies, oil field operators and the like, need only maintain a supply and have available one or more cables with modified Reda couplings thereon and adapters A such as I provide, in order to replace the cables with either B.J. or Reda pumps.

Having described only one typical preferred form and application of my invention, I do not wish to be limited or restricted to the specific details herein set forth, but wish to reserve to myself any modifications and/or variations that may appear to those skilled in the art to which this invention pertains.

Having described my invention, I claim:

1. In combination, an elongate vertical power cable for a well pump, a coupling at the lower end of the cable, a well pump with housing having coupling receiving means which is not compatible with the coupling, and an adapter between the coupling and receiving means, said coupling having a central substantially vertical body portion and a flange-like base portion at the lower end of the body portion, a central opening in which the lower end of the cable is engaged and fixed and from which cable conductor leads depend, said base portion having a flat bottom surface, an annular depending orienting boss about the central opening to slidably enter an annular recess in a compatible receiving means, an annular malleable metal sealing ring about the boss and a pair of fastener receiving openings in the base portion, said receiving means including a flat substantially vertically disposed support surface, a cylindrical, upwardly opening, electrical junction chamber central of the support surface and a pair of fastener receiving openings spaced laterally of the chamber, said adapter comprising a plate with flat top surface opposing the bottom surface of the coupling and engaging the malleable metal seal, a central upwardly opening annular recess receiving the boss, a flat bottom surface opposing the support surface, an annular depending skirt engaged in the chamber, O-rings carried in grooves in the skirt and sealing between the skirt and the chamber, a central passage communicating with the central opening and the chamber and a pair of fastener openings registering with the fastener openings in the adapter and of the receiving means and screw fasteners cooperatively engaged in and through said registering openings and holding the coupling, adapter and receiving means in tight engagement with each other.

2. A structure as set forth in claim 1 wherein the coupling is further provided with a second pair of fastener receiving openings of different diameter and on axes spaced from the axes of the first mentioned fastener receiving openings and adapted to register with receiving means compatible with the coupling.

3. A structure as set forth in claim 1 wherein the coupling base is ovoid in plane configuration with end portions projecting from opposite sides of the body portion, said fastener receiving openings occurring in said end portions of the base portion on axes parallel with and laterally spaced from the axis of the body portion.

4. A structure as set forth in claim 3 wherein the coupling is further provided with a second pair of fastener receiving openings of different diameter and on axes spaced from the axes of the first mentioned fastener receiving openings and adapted to register with receiving means compatible with the coupling.

5. A structure as set forth in claim 3 wherein said adapter is substantially the same in plane configuration as the base portion of the coupling base, and wherein the support surface is radially outwardly and upwardly inclined, defines the bottom of a radially outwardly opening upwardly divergent recess in the housing and corresponds in general plane configuration with and freely accommodates the adapter.

6. A structure as set forth in claim 1 wherein said coupling has an annular sleeve about the central opening and depending from the boss, said adapter having an upwardly opening counter bore at the bottom of the recess and upper portion of said central passage and receiving the sleeve.

7. A structure as set forth in claim 6 wherein the coupling is further provided with a second pair of fastener receiving openings of different diameter and on axes spaced from the axes of the first mentioned fastener receiving openings and adapted to register with receiving means compatible with the coupling.

8. A structure as set forth in claim 6 wherein the coupling base is ovoid in plane configuration with end portions projecting from opposite sides of the body portion, said fastener receiving openings occurring in said end portions of the base portion on axes parallel with and laterally spaced from the axis of the body portion.

9. A structure as set forth in claim 8 wherein said adapter is substantially the same in plane configuration as the base portion of the coupling base; and wherein the support surface is radially outwardly and upwardly inclined, defines the bottom of a radially outwardly opening upwardly divergent recess in the housing and corresponds in general plane configuration with and freely accommodates the adapter.

* * * * *